United States Patent
Nishioka (10) Patent No.: US 9,702,733 B2
(45) Date of Patent: Jul. 11, 2017

(54) ROTATION ANGLE SENSOR PROVIDED WITH PEDESTAL AND ROTARY MACHINE

(71) Applicant: FANUC CORPORATION, Yamanashi (JP)

(72) Inventor: Akira Nishioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 259 days.

(21) Appl. No.: 14/692,086

(22) Filed: Apr. 21, 2015

(65) Prior Publication Data
US 2015/0308857 A1   Oct. 29, 2015

(30) Foreign Application Priority Data
Apr. 25, 2014 (JP) .................. 2014-091413

(51) Int. Cl.
*G01D 5/14* (2006.01)
*G01D 5/244* (2006.01)
*H02K 11/21* (2016.01)

(52) U.S. Cl.
CPC ........... *G01D 5/14* (2013.01); *G01D 5/24442* (2013.01); *H02K 11/21* (2016.01)

(58) Field of Classification Search
CPC ....... G01D 5/24442; G01D 5/14; H02K 11/21
USPC ...................................... 310/65 B
See application file for complete search history.

(56) References Cited

U.S. PATENT DOCUMENTS 6,404,185 B1 *   6/2002  Allwine ................. G01D 5/145
                                                        324/207.2
2005/0285592 A1 * 12/2005 Taniguchi ............ G01D 5/2457
                                                       324/207.25

FOREIGN PATENT DOCUMENTS

| DE | 10333249 A1 | 3/2004 |
|---|---|---|
| JP | S6079115 U | 6/1985 |
| JP | S62149258 U | 9/1987 |
| JP | S63113914 U | 7/1988 |
| JP | H0380323 U | 8/1991 |
| JP | 3270668 A | 12/1991 |
| JP | H0451622 U | 4/1992 |
| JP | 200610436 A | 1/2006 |

(Continued)

OTHER PUBLICATIONS

English Abstract for Japanese Publication No. 2006-010436 A, published Jan. 12, 2006, 1pg.

(Continued)

*Primary Examiner* — Naishadh Desai
(74) *Attorney, Agent, or Firm* — Fredrikson & Byron, P.A.

(57) ABSTRACT

A rotation angle sensor for detecting a rotation angle of a shaft of the motor or shaft of a machine which is driven by a motor, equipped with a detected part at an outer circumferential part of a rotary body attached to the shaft and a detection element facing the detected part provided on a pedestal which is surrounding the shaft, wherein a recessed part which is provided at the pedestal is formed with an abutting surface which abuts against an end face of the detection element at the side far from the shaft of the detection element, the distance of the abutting surface from the axial line is made different along the peripheral direction of the pedestal, and a position of the detection element abutting against the abutting surface is moved in the peripheral direction so as to adjust the difference between the rotary body and the detection element.

9 Claims, 7 Drawing Sheets

(56) References Cited

FOREIGN PATENT DOCUMENTS

JP    2006010436 A    1/2006
WO    2010070392 A1   6/2010

OTHER PUBLICATIONS

English Abstract for Japanese Publication No. H04-51622 U, published Apr. 30, 1992, 1 pg.
English Abstract for Japanese Publication No. 03-270668 A, published Dec. 2, 1991, 1 pg.
English Abstract for Japanese Publication No. H03-80323 U, published Aug. 16, 1991, 1 pg.
English Abstract for Japanese Publication No. S63-113914 U, published Jul. 22, 1988, 1 pg.
English Abstract for Japanese Publication No. S62-149258 U, published Sep. 21, 1987, 1 pg.
English Abstract for Japanese Publication No. S60-79115 U, published Jun. 1, 1985, 1 pg.
Decision to Grant a Patent in related Japanese Application No. 2014-091413 dated Nov. 17, 2016, with English translation, 6 pgs.
English Abstract and Machine Translation for Japanese Publication No. 2006-010436 A, published Jan. 12, 2006, 7 pgs.
English Abstract and Machine Translation for German Publication No. 10333249 A1, published Mar. 4, 2004, 9 pgs.

* cited by examiner

ROTATION ANGLE SENSOR PROVIDED WITH PEDESTAL AND ROTARY MACHINE

BACKGROUND OF THE INVENTION

1. Field of the Invention

The present invention relates to a rotation angle sensor which is provided with a pedestal for adjustment of a position of a detection element and to a rotary machine 2. Description of the Related Art Detection of the speed or rotation position or rotation angle of a shaft of a motor or a shaft of a rotary machine which is driven by a motor is important in control of a motor or a rotary machine which is driven by a motor. For this reason, a rotation angle sensor which attaches a rotary body to a shaft of a motor or a shaft of a rotary machine and utilizes magnetism to detect the angle of the rotary body, that is, a "magnetic encoder", has been known.

Such a rotation angle sensor, for example, as shown in Japanese Patent Publication No. 2006-10436A, is provided with a rotary body of the sensor (detection ring) which is made of a magnetic material which is attached to a shaft for which the rotation angle is desired to be detected and a detection element which is provided with a magnetic detecting part which is arranged around the detection ring. The detection ring is provided with a detected part comprised of relief shapes which are formed at equal intervals on the surface in the peripheral direction (peripheral surface). Further, the detection element is provided with a magnet which is arranged at a position which faces the relief shapes of the detection ring and a magnetic detecting part which is arranged between the magnet and the peripheral surface where the relief shapes are formed. The magnetic detecting part is, for example, formed by applying voltage to a serial circuit of two serially connected magnetoresistance devices which change in resistance in accordance with the magnetic flux density passed. The midpoint voltage of the two magnetoresistance devices changes according to the rotation position of the shaft, whereby the rotation angle of the shaft is obtained.

On the other hand, the position where the rotation angle sensor which detects the rotation angle of the shaft of the motor or the shaft of the rotary machine is set is not always constant. The distance between the detected part of the detection ring and the detection element has to be changed in accordance with the signal strength of the detection signal which is output from the magnetic detecting part. The detection element is used fastened to a pedestal. Therefore, in the past, the distance between the detected part of the detection ring and the detection element has been adjusted by moving the detection element in the radial direction of the detection ring on a radial direction line of the detection ring (line perpendicular to axial line of shaft).

However, the method of adjusting the distance between the detected part of the detection ring and the detection element by moving the detection element in the radial direction of the detection ring is liable to cause the detection element to strike the detection ring and damage the magnetoresistance devices at the inside of the detection element, so there was the problem that the work was difficult.

SUMMARY OF THE INVENTION

The present invention has as its object the provision of a rotation angle sensor which enables easy adjustment of a distance between a detected part of a detection ring and a detection element without causing the detection element to strike the detection ring at the time of setting the detection element at the pedestal and the provision of a rotary machine.

According to one aspect of the present invention, there is provided a rotation angle sensor which detects a rotation angle of a shaft of a motor or a shaft of a machine which is driven by a motor, the rotation angle sensor comprising a rotary body which rotates attached to the shaft and is provided with a detected part at its outer circumferential part, a detection element which is set on a line which perpendicularly intersects an axial line of the shaft and faces the detected part, and a pedestal which is provided at its center part with an opening part through which the shaft is inserted and which attaches the detection element, wherein the pedestal is formed as a pedestal which is provided with a recessed part to which the detection element is attached, around the recessed part, an abutting surface which abuts against an end face of the detection element at a far side from the shaft is formed, and the abutting surface is formed so that a distance from an axial line of the shaft changes along a peripheral direction of the pedestal. Further, there is also provided a rotary machine which is provided with a rotation angle sensor which is configured in the above way.

BRIEF DESCRIPTION OF THE DRAWINGS

The present invention will be understood more clearly by referring to the drawings attached below.

DETAILED DESCRIPTION

Below, referring to the drawings, embodiments of the present invention will be explained in detail based on specific examples. However, it should be understood that the present invention is not limited to the drawings or the embodiments which are explained below. Before explaining embodiments of the present invention, as comparative art, using FIG. 1A and FIG. 1B, the structure of a conventional rotation angle sensor 10 and a method of attaching a detection element 4 to a pedestal 5 will be explained. In the figures, the same component elements are assigned the same reference notations.

Figure 1A:
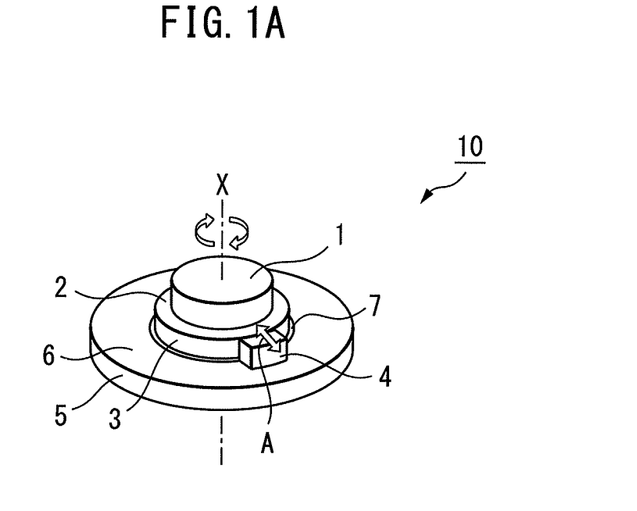
FIG. 1A is a perspective view which shows a structure of a conventional rotation angle sensor and a method of adjustment of a position of a detection element.
Figure 1B:
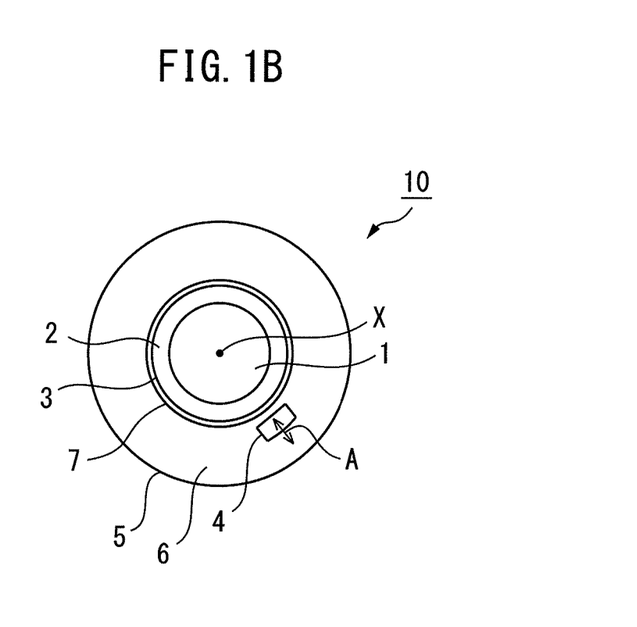
FIG. 1B is a plan view of FIG. 1A.

FIG. 1A shows the structure of a conventional rotation angle sensor 10. The rotation angle sensor 10 is provided with a rotary body 2 which is attached to a shaft 1, a pedestal 5, and a detection element 4 which is provided on the pedestal 5. FIG. 1B is a plan view of the rotation angle sensor 10 which is attached to the shaft 1 which is shown in FIG. 1A as seen from the direction of the axial line X. The shaft 1 may be the shaft of a motor etc. itself, a part which is attached to the shaft of a motor etc. and which rotates in synchronization with the shaft, a shaft of a rotary machine which is driven to rotate by a motor, or a part which is attached to the shaft of a rotary machine which is driven to rotate by a motor.

The rotary body 2 which is attached to the shaft 1 is a detection ring which made of a magnetic material and is provided with a detected part 3 comprised of relief shapes which are formed at equal intervals at its outer circumferential part. Further, the detection element 4 is placed facing the detected part 3 of the rotary body on a carrying surface 6 of the pedestal 5 which is provided with a through hole 7 through which the shaft 1 is inserted. The detection element 4 includes a magnet which is arranged at a position which faces the detected part 3 and a magnetic detecting part which is arranged between the magnet and detected part 3. The structure and function of the detection element 4 are known, so further explanation will be omitted.

The distance between the detected part 3 of the rotary body 2 and the detection element 4 has to be changed in accordance with the signal strength of the detection signal which is output from the magnetic detecting part. Therefore, in a conventional rotation angle sensor 10, the detection element 4 has been made to move on the carrying surface 6 of the pedestal 5 on the line which perpendicularly intersects the axial line X of the shaft 1 in the direction which is shown by the arrow mark A so as to adjust the distance between the detected part 3 and the detection element 4. However, with this method of adjustment, at the time of adjustment, the detection element 4 is liable to strike the detected part 3 and damage the magnetoresistance devices at the inside of the detection element 4, so the work was difficult.

The present invention improves the work of adjustment of the distance between the detected part 3 and detection element 4 in a conventional rotation angle sensor 10 and is characterized by the structure of the pedestal 5 which carries the detection element 4. Below, the rotation angle sensor which is provided with a pedestal of the present invention will be explained with reference to several embodiments, but the structure of the rotation angle sensor of the present invention is not limited to these embodiments. Note that, in the embodiments explained below, members the same as those which were explained in FIG. 1A and FIG. 1B can be used for the shaft 1, rotary body 2, detected part 3, and detection element 4, so the same members will be assigned the same reference notations and explanations will be omitted.

Figure 2A:
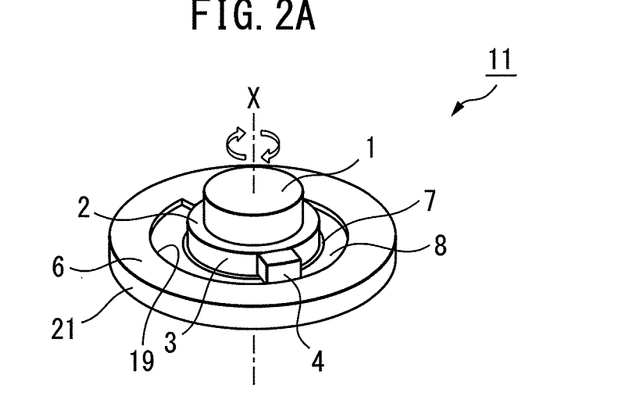
FIG. 2A is a perspective view which shows a structure of a rotation angle sensor and a method of adjustment of a position of a detection element of a first embodiment.
Figure 2B:
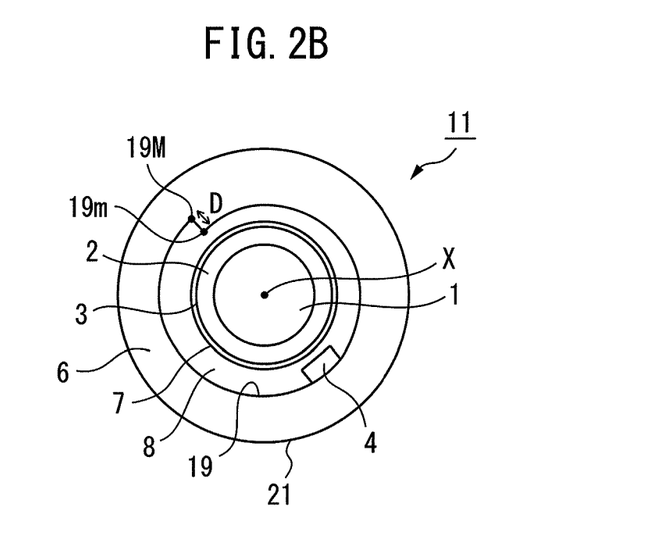
FIG. 2B is a plan view of FIG. 2A.

FIG. 2A and FIG. 2B show the structure of a rotation angle sensor 11 of a first embodiment of the present invention, wherein FIG. 2A is a perspective view of the rotation angle sensor 11 and FIG. 2B is a plan view of the rotation angle sensor 11 as seen from the axial line X direction. The rotation angle sensor 11 is provided with a rotary body 2 which is attached to a shaft 1, a detection element 4 which faces a detected part 3 of the rotary body 2, and a pedestal 21. At a carrying surface 6 of the pedestal 2, a recessed part 8 which is one step lower than the carrying surface 6 is provided around an opening part which is provided at the center part of the pedestal 21, that is, a through hole 7. Further, the outer circumferential part of the recessed part 8 is formed as an abutting surface 19 which abuts against an end face of the detection element 4 at the side far from the shaft 1. Note that, in this embodiment of the present invention, an inside diameter of the through hole 7 is formed larger than an outside diameter of the rotary body 2, but the rotary body 2 may also be positioned on the top surface of the pedestal 21, so the inside diameter of the through hole 7 may be as little as a size which enables insertion of the shaft 1.

In the rotation angle sensor 11 of the first embodiment, the abutting surface 19 is formed so that the distance from the axial line X of the shaft 1 smoothly changes and gradually increases along the peripheral direction of the pedestal 21. Further, the detection element 4 is fastened inside the recessed part 8 and faces the detected part 3 of the rotary body in the state where the end face at the side far from the shaft 1 abuts against this abutting surface 19. Here, the difference between a point 19m of the shortest distance of the abutting surface 19 from the axial line X of the shaft 1 and a point 19M of the longest distance of the abutting surface 19 from the axial line X of the shaft 1 is designated as "D". This being so, it is possible to make the end face of the detection element 4 abut against the abutting surface 19 and then make the detection element 4 move along the circumferential direction of the abutting surface 19 so as to adjust the distance between the detected part 3 of the rotary body 2 and the detection element 4 in the range of the distance D.

As a result, in adjustment of the distance between the detected part 3 of the rotary body 2 and the detection element 4, it is no longer necessary to move the detection element 4 in the direction of the line perpendicularly intersecting the axial line X of the shaft 1 toward the shaft 1 and becomes possible to perform the adjustment work without causing the detection element 4 to strike the rotary body 2.

Figure 2C:
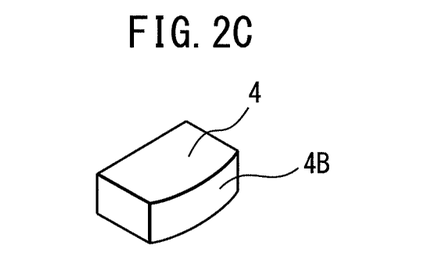
FIG. 2C is a perspective view of a detection element in the first embodiment as seen from a back surface side.

Note that, at the rotation angle sensor 11 of the first embodiment, the end face of the detection element 4 at the side far from the shaft 1 may be a flat surface, but as shown in FIG. 2C, the end face 4B at the side far from the shaft 1 may also be made a curved surface. The curved surface may also be a peripheral surface. Further, in the present embodiment, the distance of the abutting surface 19 from the axial line X of the shaft 1 is made to smoothly increase along the peripheral direction of the pedestal 21 in the clockwise direction, but it may also be made to smoothly increase along the peripheral direction of the pedestal 21 in the counterclockwise direction.

Figure 3A:
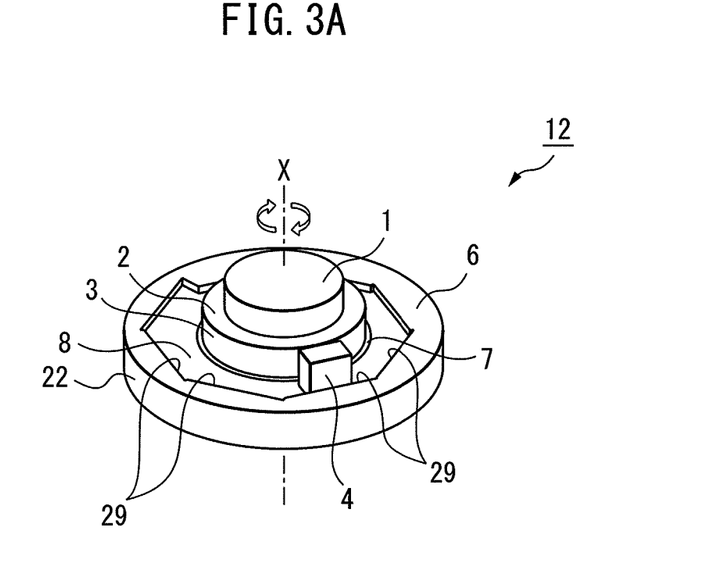
FIG. 3A is a perspective view which shows a structure of a rotation angle sensor and a method of adjustment of a position of a detection element of a second embodiment.
Figure 3B:
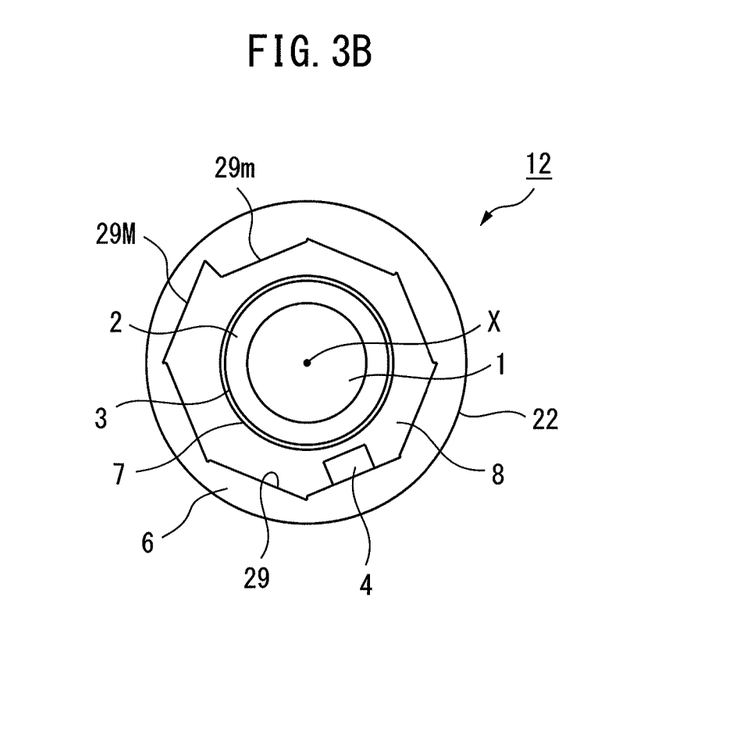
FIG. 3B is a plan view of FIG. 3A.

FIG. 3A and FIG. 3B show the structure of a rotation angle sensor 12 of a second embodiment of the present invention, wherein FIG. 3A is a perspective view of the rotation angle sensor 12 while FIG. 3B is a plan view of the rotation angle sensor 12 as seen from an axial line X direction. The rotation angle sensor 12 is provided with a rotary body 2 which is attached to a shaft 1, a detection element 4 which faces the detected part 3 of the rotary body 2, and a pedestal 22. At a carrying surface 6 of the pedestal 22, a recessed part 8 which is one step lower than the carrying surface 6 is provided around the opening part which is provided at the center part of the pedestal 22, that is, a through hole 7. Further, the outer circumferential part of the recessed part 8 is formed as an abutting surface 29 which abuts against an end face of the detection element 4 at the side far from the shaft 1.

The rotation angle sensor 12 of the second embodiment is formed so that the distance of the abutting surface 29 from the axial line X of the shaft 1 changes in stages and gradually increases along the peripheral direction of the pedestal 22 by a plurality of abutting surfaces 29. Further, the detection element 4 is fastened in the recessed part 8 facing the detected part 3 of the rotary body 2 in the state where the end face at the far side from the shaft 1 abuts against this abutting surface 29. In the second embodiment, as shown in FIG. 3B, the recessed part 8 is divided into eight sections radially about the axial line X and is provided with eight abutting surfaces 29. The abutting surfaces 29 are flat surfaces which perpendicularly intersect the line which perpendicularly intersects the axial line X of the shaft 1.

Therefore, at the rotation angle sensor 12 of the second embodiment, the end face of the detection element 4 at the side far from the shaft 1 may be a flat surface. The detection element 4 is set in the recessed part 8 abutting against any of the eight abutting surfaces 29. Here, the difference of the distance between an abutting surface 29*m* with the shortest distance from the axial line X and an abutting surface 29M with the longest distance from the axial line X is designated as "D". This being so, by making the end face of the detection element 4 abut against one of the eight abutting surfaces 29, it is possible to adjust the distance between the detected part 3 of the rotary body 2 and the detection element 4 in eight stages in the range of the distance D.

As a result, in adjustment of the distance between the detected part 3 of the rotary body 2 and the detection element 4, the end face of the detection element 4 may be made to abut against any of eight abutting surfaces 29, so it becomes possible to perform adjustment work without causing the detection element 4 to strike the rotary body 2.

Figure 4A:
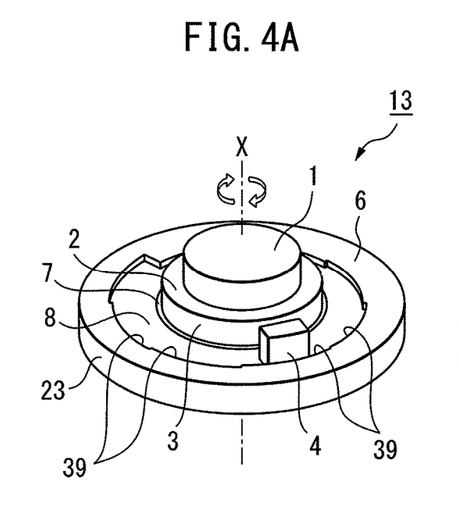
FIG. 4A is a perspective view which shows a structure of a rotation angle sensor and a method of adjustment of a position of a detection element of a third embodiment.
Figure 4B:
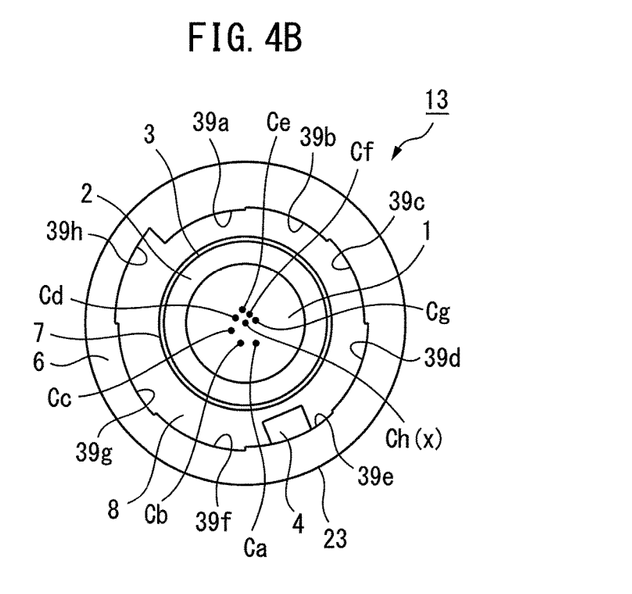
FIG. 4B is a plan view of FIG. 4A.

FIG. 4A and FIG. 4B show the structure of a rotation angle sensor 13 of a third embodiment of the present invention, wherein FIG. 4A is a perspective view of the rotation angle sensor 13 while FIG. 4B is a plan view of the rotation angle sensor 13 as seen from the axial line X direction. The rotation angle sensor 13 is provided with a rotary body 2 which is attached to a shaft 1, a detection element 4 which faces a detected part 3 of the rotary body 2, and a pedestal 23. At a carrying surface 6 of the pedestal 23, a recessed part 8 which is one step lower than the carrying surface 6 is provided around an opening part which is provided at a center part of the pedestal 23, that is, a through hole 7. Further, the outer circumferential part of the recessed part 8 is formed as an abutting surface 29 which abuts against the end face of the detection element 4 at the side far from the shaft 1.

In the rotation angle sensor 13 of the third embodiment, the abutting surface 39 is formed so that distance from the axial line X of the shaft 1 changes in stages and gradually increases along the peripheral direction of the pedestal 23 due to the plurality of abutting surfaces 39. Further, the detection element 4 is fastened inside the recessed part 8 and faces the detected part 3 of the rotary body 3 in the state with the end face at the side far from the shaft 1 abutting against this abutting surface 39. In the third embodiment, as shown in FIG. 4B, the recessed part 8 is divided into eight sections radially about the axial line X and is provided with eight abutting surfaces 39*a* to 39*h*.

The abutting surfaces 39*a* to 39*h* are circumferential surfaces which are provided with the same radii, but differ in lengths of the vertical lines dropping from the axial line X to the abutting surfaces 39*a* to 39*h*. Further, in the third embodiment, the center points Ca to Ch of the circumferential surfaces of the abutting surfaces 39*a* to 39*h*, as shown in FIG. 4B, gradually approach the axial line X. The center point Ch of the abutting surface 39*h* is superposed on the axial line X.

Figure 4C:
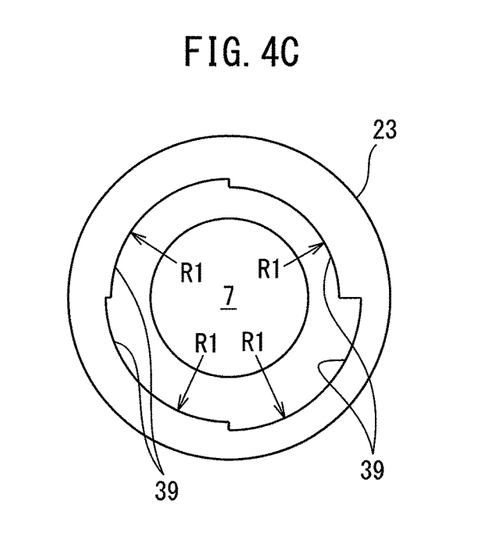
FIG. 4C is a plan view which shows another embodiment of a pedestal which is used for a rotation angle sensor of the third embodiment.
Figure 4D:
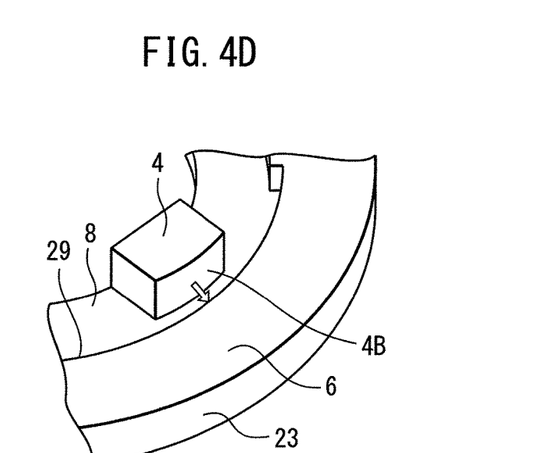
FIG. 4D is a perspective view which explains attachment of a detection element to a pedestal of a rotation angle sensor of the third embodiment.

In the third embodiment, since the abutting surfaces 39*a* to 39*h* are circumferential surfaces which are provided with the same radii, as shown in FIG. 4D, if making the end face 4B of the detection element 4 at the side far from the shaft 1 a circumferential surface provided with the same radii, the detection element 4 abuts against each of the abutting surfaces 39*a* to 39*h* without a gap. Here, the difference between an abutting surface 39*a* with the shortest distance from the axial line X and an abutting surface 39*h* with the longest distance from the axial line X is designated as "D". This being so, by making the end face of the detection element 4 abut against any of the eight abutting surfaces 39*a* to 39*h*, the distance of the detected part 3 of the rotary body 2 and the detection element 4 can be adjusted in eight stages in the range of the distance D.

As a result, in adjustment of the distance between the detected part 3 of the rotary body 2 and the detection element 4, it is sufficient to make the end face of the detection element 4 abut against one of the eight abutting surfaces 39*a* to 39*h*, so it becomes possible to perform adjustment work without causing the detection element 4 to strike the rotary body 2. Further, the radii of the circumferential surfaces of the abutting surfaces 39*a* to 39*h* are all the same, so abutting against the detection element 4 is easy.

FIG. 4C shows another embodiment of a pedestal 23 which is used for a rotation angle sensor 13 of the third embodiment. In the embodiment which is shown in FIG. 4A and FIG. 4B, the recessed part 8 was divided radially into eight equal sections, but in the embodiment which is shown in FIG. 4C, the recessed part 8 is divided radially into four equal sections. The four abutting surfaces 39 are all circumferential surfaces with the radius R1. Further, in the pedestal 23 which is shown in FIG. 4B, the lengths of the vertical lines dropping down from the axial line X to the abutting surfaces 39*a* to 39*h* gradually increased clockwise about the axial line X. On the other hand, in the embodiment which is shown in FIG. 4C, the distances of the four abutting surfaces 39 from the axial line X become gradually larger counterclockwise. In the embodiment which is shown in FIG. 4C, by making the end face of the detection element 4 abut against any of the four abutting surfaces 39, it is possible to adjust the distance between the detected part 3 of the rotary body 2 and the detection element 4 in four stages. In this way, the number of sections into which the abutting surface 39 is divided and the direction in which the distance from the axial line becomes smaller are not particularly limited.

Figure 5A:
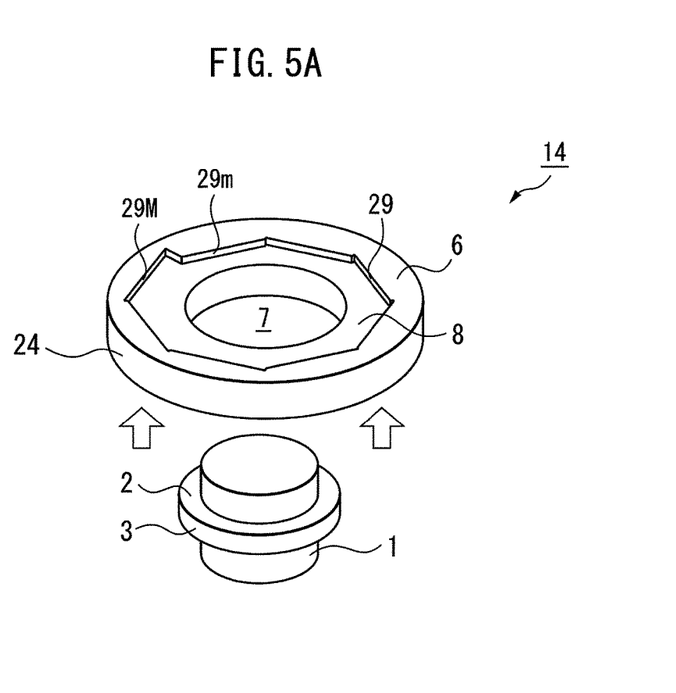
FIG. 5A is a perspective view which shows the structure of a pedestal which is used for a rotation angle sensor of a fourth embodiment.

FIG. 5A shows the structure of a rotation angle sensor 14 of a fourth embodiment of the present invention. The rotation angle sensor 14 is provided with a rotary body 2 which is attached to a shaft 1 and a pedestal 24. At the outer circumferential part of the rotary body 2, a detected part 3 is provided. Note that, FIG. 5A omits illustration of the detection element 4. At a carrying surface 6 of the pedestal 24, a through hole 7 through which the shaft 1 is inserted is provided at the center part. An inside diameter of the through hole 7 is larger than an outside diameter of the detected part 3 of the rotary body 2 which is attached to the shaft 1. Therefore, the pedestal 24 can be detached from the shaft 1 in the state with the rotary body 2 attached to the shaft 1 and can be turned around and attached to the shaft 1.

Figure 5B:
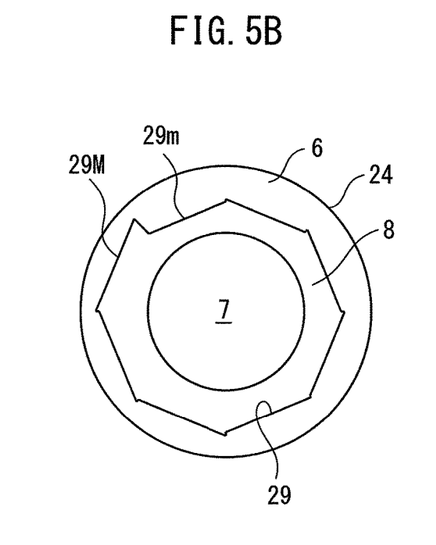
FIG. 5B is a plan view which shows the structure of a front surface side of the pedestal which is shown in FIG. 5A.
Figure 5C:
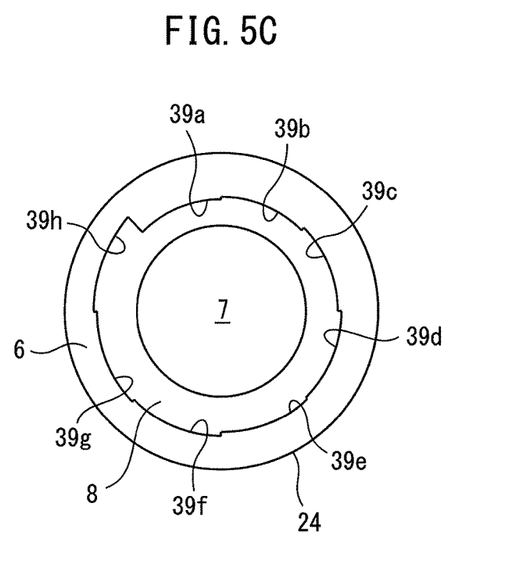
FIG. 5C is a plan view which shows the structure of a back surface side of the pedestal which is shown in FIG. 5A.

Therefore, in the fourth embodiment, as shown in FIG. 5B, at the front surface side of the pedestal 24, a recessed part 8 which is one step lower than the carrying surface 6 is provided around the through hole 7 and an abutting surface 29 similar to the second embodiment is provided at the outer circumferential part of the recessed part 8. On the other hand, at the back surface side of the pedestal 24, as shown in FIG. 5C, a recessed part 8 which is one step lower than the carrying surface 6 is provided around the through hole 7 and abutting surfaces 39a to 39h similar to the third embodiment are provided at the outer circumferential part of the recessed part 8. As explained above, the abutting surface 29 is a flat surface, while the abutting surfaces 39a to 39h are circumferential surfaces with the same radii.

Therefore, the rotation angle sensor 14 which is provided with the pedestal 24 of the fourth embodiment can handle a detection element 4 with an end face which is a flat surface or a circumferential surface. Note that, what kind of abutting surfaces to provide at the front surface side and back surface side of the pedestal 24 is not particularly limited. If making the difference of the distances of the adjoining abutting surfaces from the axial line X much smaller and forming them divided between the front surface side and back surface side, it is possible to adjust the distance between the detected part 3 of the rotary body 2 and the detection element 4 in multiple stages and the range of adjustment becomes broader. Further, the pedestal 24 need not be a single one. It is also possible to prepare several.

Furthermore, in the above explained embodiments, a pedestal of a donut shape with a through hole at its center was explained, but the pedestal may also form a U-shape which enables insertion over the shaft or detachment from it from the side. The shape of the pedestal is not particularly limited. Next, an embodiment where the pedestal is U-shaped will be explained as an example.

Figure 6A:
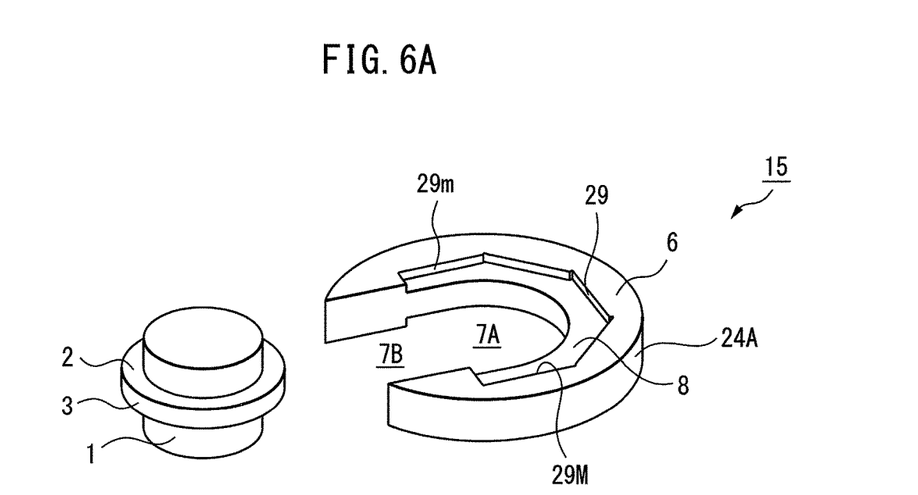
FIG. 6A is a perspective view which shows the structure of a pedestal which is used for a rotation angle sensor of a fifth embodiment.

FIG. 6A shows the structure of a rotation angle sensor 15 of a fifth embodiment of the present invention. The rotation angle sensor 15 is provided with a rotary body 2 which is attached to a shaft 1 and a pedestal 24A. At an outer circumferential part of the rotary body 2, a detected part 3 is provided. Note that, FIG. 6A omits illustration of a detection element 4. The pedestal 24A of the fifth embodiment differs in shape of the opening part from the pedestal 24 of the fourth embodiment. The pedestal 24A of the fifth embodiment is provided with a semicircular part 7A with an inside diameter which is larger than the outside diameter of the shaft 1 and a cutaway part 7B which continues from the semicircular part 7A, has the same width as the diameter of the semicircular part 7A, and is cut away up to the outer circumferential part of the pedestal 24A and forms a U-shape. Therefore, the pedestal 24A can be attached to the shaft 1 from the horizontal direction by utilizing the cutaway part 7B.

Figure 6B:
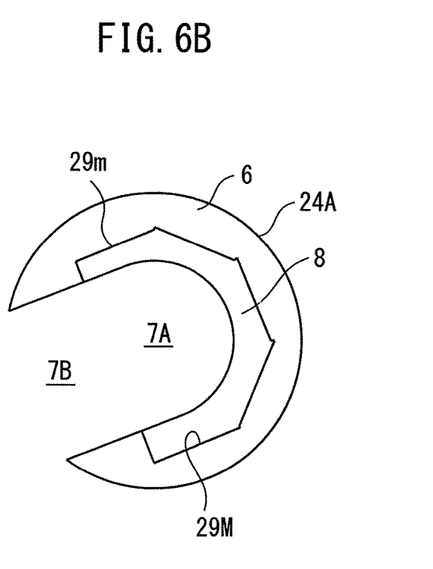
FIG. 6B is a plan view which shows the structure of a front surface side of the pedestal which is shown in FIG. 6A.
Figure 6C:
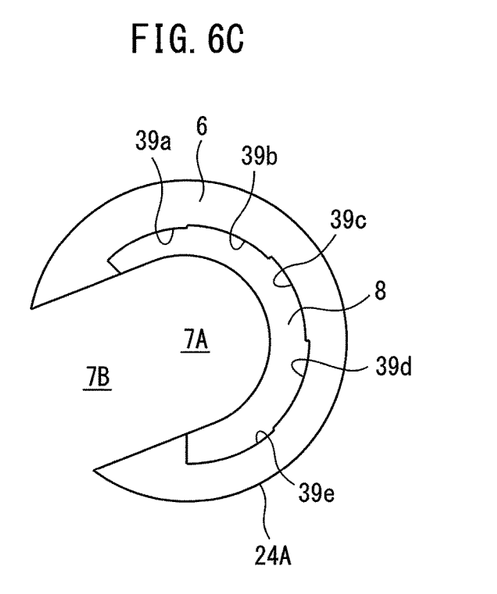
FIG. 6C is a plan view which shows the structure of a back surface side of the pedestal which is shown in FIG. 6A.

Further, the pedestal 24A is provided with a recessed part 8 and abutting surface 29 at its two surfaces. One example is shown in FIG. 6B and FIG. 6C. In the fifth embodiment, as shown in FIG. 6B, the front surface side of the pedestal 24A is provided around a semicircular part 7A with a recessed part which is one step lower than the carrying surface 6, while the outer circumferential part of the recessed part 8 is provided with a flat abutting surface 29 similar to the fourth embodiment. In the fifth embodiment, there are five abutting surfaces 29 from an abutting surface 29m with the shortest distance from the center part of the half circle of the semicircular part 7A to an abutting surface 29M with the longest distance from the center part of the half circle of the semicircular part 7A. The distance from the detected part 3 of the rotary body 2 to the detection element 4 can be adjusted in five stages.

On the other hand, at the back surface side of the pedestal 24A, as shown in FIG. 6C, a recessed part 8 which is one step lower than the carrying surface 6 is provided around the semicircular part 7A, while five abutting surfaces 39a to 39e are provided at the outer circumferential part of the recessed part 8. The abutting surfaces 39a to 39e, in the same way as the third embodiment, are circumferential surfaces with the same radii. The distance from the center point of the half circle of the semicircular part 7A to the abutting surfaces 39a to 39e is changed in five stages. In this way, in the pedestal 24A of the fifth embodiment, by making the end face of the detection element 4 abut against one of the five abutting surfaces 29 at the front side, the distance of the detection element 4 from the detected part of the rotary body 2 can be adjusted in five stages. Similarly, by making the end face of the detection element 4 abut against one of the five abutting surfaces 39a to 39e of the back side of the pedestal 24A, it is possible to adjust the distance of the detection element 4 from the detected part 3 of the rotary body 2 in five stages.

Therefore, the rotation angle sensor 15 which is provided with the pedestal 24A of the fifth embodiment can handle a detection element 4 with an end face which is a flat surface or which is a circumferential surface. What kind of abutting surface is provided at the front surface side and back surface side of the pedestal 24A is not limited. The pedestal 24A can be easily changed, so if providing a plurality of pedestals which have different types of abutting surfaces, it is possible to adjust the distance of the detection element 4 from the detected part 3 of the rotary body 2 in greater stages and the range of adjustment becomes greater.

Figure 7:
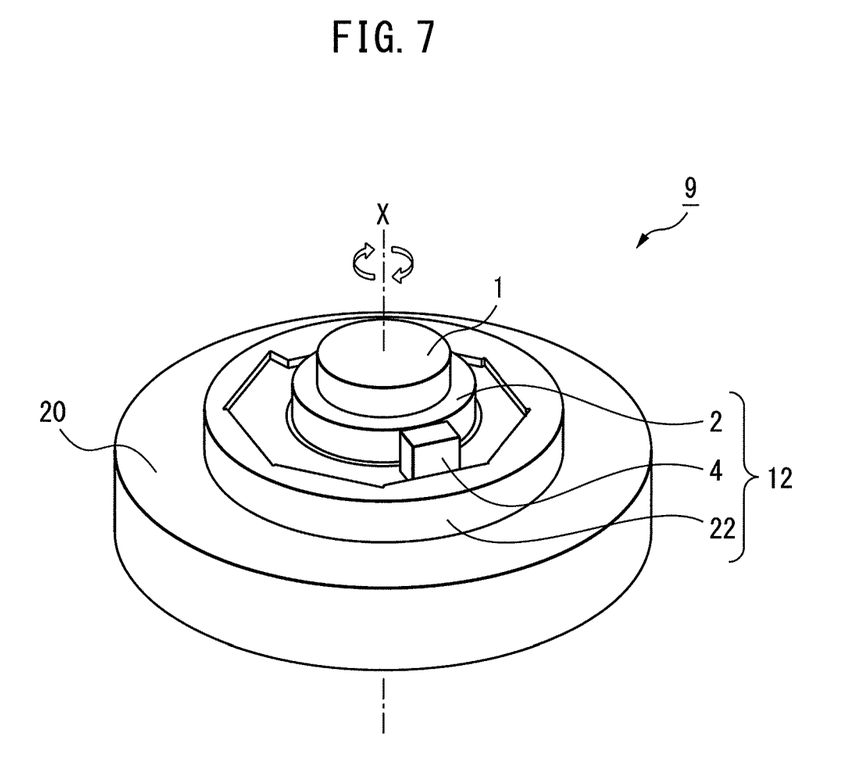
FIG. 7 is a perspective view of a rotary machine to which a rotation angle sensor of the present invention is attached.

FIG. 7 shows a rotary machine 9 to which a rotation angle sensor 12 of the second embodiment of the present invention is attached and shows a pedestal mounting part 20 of the rotary machine 9. The rotation angle sensor 12 which is attached to the pedestal mounting part 20 is not limited to the rotation angle sensor 12 of the second embodiment. A rotation angle sensor of another embodiment can also be attached. By using a rotation angle sensor which is provided with a pedestal in this way, it becomes possible to enable handling of the pedestal without changing other parts of the rotary machine 9.

According to the rotation angle sensor which is provided with a pedestal and the rotary machine of the present invention, there are the effects that the work of adjustment of the detection element becomes easy and the detection device is no longer liable to be damaged.

Above, the present invention was explained with reference to preferred embodiments, but a person skilled in the art would understand that various modifications and changes can be made without departing from the scope of the later explained claims.

What is claimed is:

1. A rotation angle sensor which detects a rotation angle of a shaft of a motor or a shaft of a machine which is driven by a motor, said rotation angle sensor comprising:

a rotary body which rotates attached to said shaft and is provided with a detected part at its outer circumferential part;

a detection element which is set on a line which perpendicularly intersects an axial line of said shaft and faces said detected part; and a pedestal which is provided at its center part with an opening part through which said shaft is inserted and which attaches said detection element, wherein said pedestal is formed as a pedestal which is provided with a recessed part to which said detection element is attached, around said recessed part, an abutting surface which abuts against an end face of said detection element at a far side from said shaft is formed, and said abutting surface is formed so that a distance from an axial line of said shaft changes along a peripheral direction of said pedestal.

2. The rotation angle sensor according to claim 1 wherein said abutting surface is formed from a plurality of abutting surfaces so that a distance of said abutting surface from the axial line of said shaft which changes along the peripheral direction changes in stages.

3. The rotation angle sensor according to claim 2 wherein said plurality of abutting surfaces are circumferential surfaces of the same radii.

4. The rotation angle sensor according to claim 2 wherein said plurality of abutting surfaces are flat surfaces which perpendicularly intersect a line which perpendicularly intersects the axial line of said shaft.

5. The rotation angle sensor according to claim 3 wherein in said detection element, the shape of the end face of said detection element at the side far from said shaft is a shape which is attached to said plurality of abutting surfaces without gap.

6. The rotation angle sensor according to claim 1 wherein said pedestal can be attached to said shaft reversed and the back surface side of said pedestal is formed with an abutting surface of a shape different from said abutting surface which is formed at the front side of said pedestal.

7. The rotation angle sensor according to claim 1 wherein said opening part is a circular hole with an inside diameter which is larger than the outside diameter of said shaft.

8. The rotation angle sensor according to claim 1 wherein said opening part has a semicircular part with an inside diameter which is larger than the outside diameter of said shaft and a cutaway part which continues from said semicircular part, has the same width as the diameter of said semicircular part, and is cut away up to the outer circumferential part of said pedestal.

9. A rotary machine which is provided with a rotation angle sensor which detects a rotation angle of a shaft of a motor or a shaft of a machine which is driven by a motor, said rotation angle sensor comprising;

a rotary body which rotates attached to said shaft and is provided with a detected part at its outer circumferential part;

a detection element which is set on a line which perpendicularly intersects an axial line of said shaft and faces said detected part; and a pedestal which is provided at its center part with an opening part through which said shaft is inserted and which attaches said detection element, wherein said pedestal is formed as a pedestal which is provided with a recessed part to which said detection element is attached, around said recessed part, an abutting surface which abuts against an end face of said detection element at a far side from said shaft is formed, and said abutting surface is formed so that a distance from an axial line of said shaft changes along a peripheral direction of said pedestal.

\* \* \* \* \*